Patented Aug. 11, 1925.

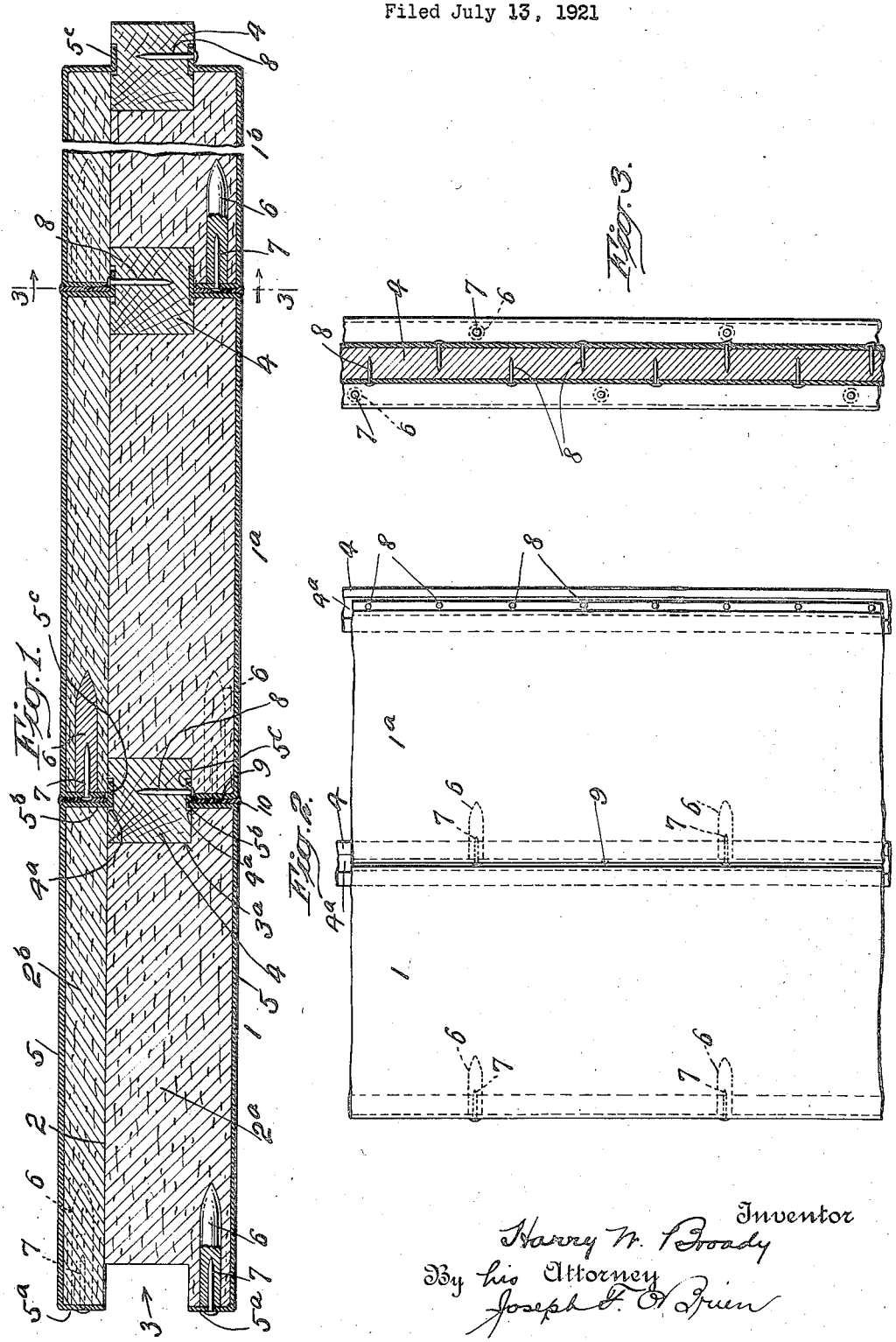

1,549,290

UNITED STATES PATENT OFFICE.

HARRY W. BROADY, OF BAYSIDE, NEW YORK, ASSIGNOR, BY MESNE ASSIGNMENTS, TO AMERICAN BALSA WOOD CORPORATION, A CORPORATION OF NEW YORK.

HEAT-INSULATING STRUCTURAL MATERIAL.

Application filed July 13, 1921. Serial No. 484,339.

*To all whom it may concern:*

Be it known that I, HARRY W. BROADY, a citizen of the United States, and a resident of Bayside, borough of Queens, county of Queens, and State of New York, have invented certain new and useful Improvements in Heat-Insulating Structural Materials, of which the following is a specification.

This invention relates to improvements in heat-insulating structural material which embodies a core of balsa wood or other similar soft and porous wood of low specific gravity to which is fastened a sheathing of a hard and tough structural material, such as plates of steel or other metal.

One of the objects of this invention is to enable the ready assembly of parts and the erection of material of the character above described into structures which will have great strength, rigidity and durability in addition to high heat-resisting qualities.

Another object of my invention is the formation of such material into structural units which may be readily and easily handled and quickly and easily installed and securely fastened together to build any desirable structure such as a railway car, refrigerating plant, refrigerating or shipping boxes or similar structures.

Another object of my invention is the production of a structural unit in which the component parts will be securely anchored to each other, and to this end the metallic sheathing plates are bent inwardly at a right angle to the surface of the core at each end of a unit and are directly anchored at one end of the unit to ribs or splines of relatively tough wood and to dowels embedded in the balsa wood core at the opposite end.

Another object is to reinforce a structure formed of this material and to strengthen the joints or connections between the component parts of a structure formed of this material against stresses which may be applied on the outside, including, for example, the vibrations and jolts encountered in its use as the wall, floor or ceiling of a railway car and the bumping of hand trucks and other articles against the same.

Another object of my invention is to enable the welding of the abutting sheathing plates of such composite material without the buckling thereof under the welding heat.

Another object of my invention is the formation of a channel between abutting metallic sheathing plates into which molten welding metal may be poured to enable a more solid and secure welding of the metal sheathing plates than can be obtained by welding flat plates to each other.

Another object of my invention is to enable the solid welding of metallic sheathing plates and at the same time to prevent the contact of molten metal with the balsa wood or with the ribs or splines, whereby charring or combustion of the wooden parts of the unit is prevented.

Another object of my invention is to produce a substantially sealed and tight joint between sheathing plates which will have great reinforcing characteristics and also fire-proofing qualities as well as heat-insulating qualities.

With these and other objects in view, the invention comprises the combination of members and arrangements of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a cross-section of a panel composed of a series of units embodying my invention;

Fig. 2 is a plan view of two units connected together; and

Fig. 3 is a section on the line 3—3 of Fig. 1.

Referring now to these drawings, 1—1ª—1ᵇ indicate three units of heat-insulating material assembled and fastened together to form a panel or a portion of a wall, floor, ceiling or like structural part of a refrigerating railway car or other refrigerating structure where it is desired to employ a material that will possess heat-insulating properties of a high degree combined with structural strength, lightness in weight and durability.

The panel therefore is built up of units and each of the units 1—1ª—1ᵇ is composed of a core 2 comprising, as shown, boards 2ª—2ᵇ of balsa wood or other similar soft and porous wood of low specific gravity, which boards are suitably secured together by gluing or in any other suitable manner. Said core 2 is preferably provided, as illustrated, at opposite connecting edges with grooves 3—3ᵃ which, as shown, are so provided by forming an L-shaped cut out portion in the board 2ᵃ and fastening the board 2ᵇ so as to extend over the cut out portion at opposite ends to provide said grooves 3—3ᵃ.

Each unit is preferably provided at one connecting edge with a rib or spline 4 of relatively tough wood which is seated in one of the grooves 3—3ᵃ and extends beyond the edge of the core 2 and is adapted to extend into the other groove in an abutting unit. In the embodiment shown, the post or spline 4 is so partially seated in the groove 3ᵃ and has a portion extending into the groove 3 of the abutting unit. The rib 4 thus keys the two cores together, but it also serves to permit a direct anchoring thereto of outer metallic sheathings 5 which abut against the opposite side faces of the core and are preferably bent inwardly along the edges thereof into contiguity with the grooves 3—3ᵃ. At one end of the core the metallic sheathing is so bent to form straight inwardly-extending flanges 5ᵃ which are preferably fastened to the balsa wood boards 2ᵃ—2ᵇ. This fastening is preferably, as shown, accomplished by embedding in the balsa-wood boards, wooden dowels or plugs 6 and fastening, by metallic fastening devices or nails 7, the inwardly-extending flange 5ᵃ to the plug or dowel 6. The wooden dowels or plugs 6 are preferably glued in place in the balsa wood boards to procure a better hold. The sheathings 5 at the opposite edge of the unit are preferably bent along the edge of the core to the groove and again bent outwardly so as to form L-shaped flanges 5ᵇ. The outwardly bent portions 5ᶜ which I shall call "foot portions" are preferably seated in grooves 4ᵃ formed in the opposite sides of the post or spline 4 and fastened to the posts by metallic fastening devices or nails 8.

A structural unit is formed in the manner hereinabove described in which the component parts are securely and solidly fastened together. Thus the metallic sheathing is securely and firmly anchored to the balsa-wood core and also to posts or splines which are likewise fastened and keyed to the core. A unit is thus formed which is capable of quick and easy connection with a similar unit or series of units to form a panel which may be used as the walls, floor or ceiling of a railway refrigerating car or for any other suitable purpose, and which provides for the quick keying together, assembling and solid fastening of a series of units in an assembled structure.

In such an assembled structure, the outwardly-extending post or spline 4 which is as aforesaid seated and fastened in a groove at one connecting edge of the unit is fitted into the groove 3 of an abutting unit to initially key such units together. When the units are in this position the inwardly-extending metal flanges 5ᵃ—5ᵇ will abut against each other and when the units are fastened together a solid metallic strengthening or reinforcing rib for the united structure is formed. These abutting straight and L-shaped flanges also provide narrow channels or pockets 9 with metal side walls and bottom into which a core 10 of molten welding metal may be poured for the purpose of fastening the units together and completely sealing up the joint therebetween. A joint thus formed of such corner flanges will prevent the buckling of the sheathing plates during the welding operation and will prevent the molten metal from contacting with either the balsa wood boards or posts, thus preventing the charring or burning thereof. A joint of this character provides greater contact surface for the welding metal and I am thus enabled to produce a more solid weld than would be possible in the case of welding overlapping plates in addition to procuring the reinforcing of the panel or wall so formed.

A panel or wall formed in accordance with my invention will not only have heat-insulating qualities of a high degree but will, notwithstanding the use of the porous and easily fracturable heat-insulating material as a core, provide a strong and durable wall surface which may be utilized as the walls or floors of railway cars or for other purposes. A panel, wall, floor or ceiling of this material will furthermore have in addition to its heat-insulating qualities, fire resisting qualities of a high degree and the strength and durability of the structure is procured without materially affecting its heat-insulating qualities of the balsa wood boards.

The balsa wood or other similar light, porous and heat-insulating wood employed is preferably treated with paraffin or other suitable substance to preserve and waterproof the same, and such treatment is preferably carried out substantially in accordance with the process described in Reissue Letters Patent to Robert Athelstan Marr, No. 13,952, whereby the pores are lined or encysted with such material and waterproofing and preserving is accomplished without materially adding to the weight and porous qualities of the wood.

Having described my invention I claim:—

1. A heat-insulating structural material comprising a plurality of units each composed of a core of relatively soft and light heat-insulating wood, a rib of relatively tough wood secured to one edge of said core and having a keying engagement with the adjacent edge of the next unit; an outer metallic sheathing covering the surface of said core and bent to cover the edge portions thereof and means for fastening said sheathing to the core and to the rib.

2. A heat-insulating structural material comprising a plurality of units each composed of a core of balsa wood, a rib of relatively tough wood secured to one edge of said core and having a keying engagement with the adjacent edge of the next unit; an outer metallic sheathing covering the surface of said core and bent to cover the edge portions thereof and means for fastening said sheathing to the core and to the rib.

3. A heat-insulating structural unit composed of a core of a relatively soft and light heat-insulating wood and having grooves at opposite edges between the side surfaces thereof, an anchor rib of relatively tough wood having a portion of the sides and one edge seated in one of said grooves and extending outwardly therefrom to permit the seating of another portion in a groove of an edge of another unit, metallic sheathing members covering the opposite surfaces of said core and bent to have flanges at opposite edges extending inwardly to cover the opposite edge portions of said core, means for anchoring the inwardly-extending flanges at one edge of the core to the rib and means for fastening the flanges at the other end to the edge of the core.

4. A heat insulating structural unit composed of a core of balsa wood having grooves at opposite edges between the side surfaces thereof, an anchor rib or relatively tough wood having a portion of the sides and one edge seated in one of said grooves and extending outwardly therefrom to permit the seating of another portion in a groove of an edge of another unit, metallic sheathing members covering the opposite surfaces of said core and bent to have flanges at opposite edges extending inwardly to cover the opposite edge portions of said core, means for anchoring the inwardly extending flanges at one edge of the core directly to the rib; anchor plugs of relatively tough wood embedded in the balsa wood core at the opposite edge and metallic fasteners for connecting the inwardly extending flanges at said opposite edge of the unit to said wooden plugs.

5. A panel composed of a plurality of units each comprising a core formed of balsa wood and having at each edge a section of a rib seat arranged between the side surfaces thereof, a rib partially embedded in one of said sections of rib seats in each unit and having a portion extending outwardly and fitting within the adjacent rib seat section in the next unit, metallic sheathing members covering the opposite side surfaces of each unit and each member having inwardly bent flanges at opposite ends, one of which has a foot portion abutting against and fastened to the respective rib, and the other flange extending inwardly to the mouth of the adjacent seat section, each rib spacing the adjacent flanges of the respective sections to provide a channel having metallic walls; and a connection of welding metal seated in each channel to connect the units together.

6. The combination of a pair of units each composed of oppositely disposed shell portions of sheet metal, each bent into substantially channel-bar conformation with the flanges of the channel bars extending toward each other; a rib of relatively tough wood interposed between said units and having the adjacent flanges of the shell portions of one unit connected thereto; a core of soft wood of low specific gravity disposed between the shell portions of each unit and connected thereto; and a welded joint for securing the adjacent flanges of said units to each other.

7. The combination of a pair of units each composed of oppositely disposed shell portions of sheet metal, each bent into substantially channel-bar conformation with the flanges of the channel bars extending toward each other, one flange of each shell portion having a foot extending at substantially right angles therefrom, a rib of relatively tough wood inserted between each pair of feet and directly fastened thereto; a core of soft, light wood interposed between the shell portions of each unit, and connected to the other flanges thereof; and a welded joint for securing the adjacent flanges of said units to each other.

8. A structural unit consisting of a core of balsa wood, outer sheathings of metal on each face thereof, having inwardly directed terminal flanges, and a rib of fastener retentive material seated in a groove at the edge of said core and projecting beyond said flanges, one of said flanges being attached to the balsa wood core and the other being attached to said rib.

In witness whereof I have signed my name to the foregoing specification in the presence of two subscribing witnesses.

HARRY W. BROADY.

Witnesses:
 JULIUS M. LUTZ,
 HELEN V. WHIDDEN.